United States Patent [19]

Demerson

[11] 4,104,959
[45] Aug. 8, 1978

[54] ROASTING JACK

[76] Inventor: Jean Robert Demerson, 15, Place Royale, Versailles, France, 78000

[21] Appl. No.: 771,813

[22] Filed: Feb. 23, 1977

[30] Foreign Application Priority Data

Feb. 27, 1976 [FR] France .............................. 76 05467
Oct. 26, 1976 [FR] France .............................. 76 32164

[51] Int. Cl.² ............................................. A47J 37/04
[52] U.S. Cl. ................................................ 99/421 H
[58] Field of Search ............ 99/421 R, 421 M, 421 H, 99/421 HH; 126/25 R

[56] References Cited
U.S. PATENT DOCUMENTS

| 3,070,953 | 1/1963 | Carrel | 99/421 M X |
| 3,294,010 | 12/1966 | Zentko | 99/421 M |
| 3,298,247 | 1/1967 | Juno | 99/421 H |
| 3,630,139 | 12/1971 | Wehrie | 99/421 H |

Primary Examiner—Edward J. McCarthy
Attorney, Agent, or Firm—Staas & Halsey

[57] ABSTRACT

A roasting jack moved by radiation from a fire having a shaft mounted in a system of bearings permitting the shaft to rotate about its axis, a rotating unit in the extension of the shaft and in an extended position in relationship to the system of bearings to permit free rotation of the shaft, the rotating unit having a first portion supporting the roasting food piece and a second portion between the shaft and the first portion and able to curve under the effect of differential expansion resulting from the difference in temperature of the generatrix which receives direct radiation from the fire and that diametrically opposite.

16 Claims, 15 Drawing Figures

ROASTING JACK

The present invention has for its object a device making it possible to cause the turning of pieces of food to be roasted on a barbecue, a wood fire or any other source of heat using only the thermal energy emitted by the fire.

There are now various types of turnspits making it possible to obtain this result but all require a source of energy independent of the fire, for example, an electric battery driving a motor reducer, a manually wound spring which stores a certain mechanical energy and transmits the movement of rotation through a series of pinions to the turnspit shaft.

No device functions exclusively with the heat radiated by the fire as is the case of the present invention.

The operating principle resides in the differential elongation caused by the thermal expansion of the metal elements which are at different temperatures; the metal elements closer to the fire expand more than those that are farther away, which causes a deformation.

The operating phenomenon resides in the following phenomenon:

When there is heated on one side an elongated piece such as a metal rod or pipe, it is found that this piece is deformed by curving; the generatrix of the piece that is subjected directly to the fire takes on a temperature considerably higher than that of the opposite generatrix and elongates more.

Under the effect of this unequal expansion, the piece curves, the convexity being oriented toward the fire.

This phenomenon can be observed when a spit, supported by its two ends is placed over a fire; its central part lowers slightly thus presenting a stable balance since the center of gravity of the piece thus deformed is below its axis of rotation.

The present invention consists in making this balance unstable by causing an elevation of the center of gravity which is obtained by mounting the piece in an unstable position above the fire; the differential expansion curves the piece upward which, if it is mobile around its initial axis, starts to turn thus presenting to the radiation of the fire another generatrix which is heated while the previous one cools since it is no longer subjected to the radiation of the fire; the device therefore starts turning slowly and regularly provided, however, it is not required to provide too great a couple which is generally the case of a turnspit.

More precisely, the turnspit according to the invention is remarkable in that it comprises a shaft mounted in a system of rings or bearings allowing its free rotation around its axis and, in the extension of shaft and the unstable position in relation to system of rings or bearings a rotating unit, driven in rotation by shaft, said unit being made up of a first part supporting the roasting food piece, and a second part, metallic, located between shaft and first part, able to curve under the effect of the differential expansion resulting from the different temperature of the generatrix which receives the direct radiation of the fire and of that diametrically opposite.

Other advantages and characteristics will be brought out better from a reading of the following description given with reference to the figures given by way of indication and in no way limiting, of which:

FIG. 1 schematically represents the turnspit according to the invention

FIG. 5 represents an improvement in the device of FIG. 1

FIGS. 6a and 6b show an end view of the improvement of FIG. 5, in two different positions

FIG. 11 is a profile view of the second variant of the first part.

FIG. 12 is a profile view of the second variant of the second part.

Figure 1:
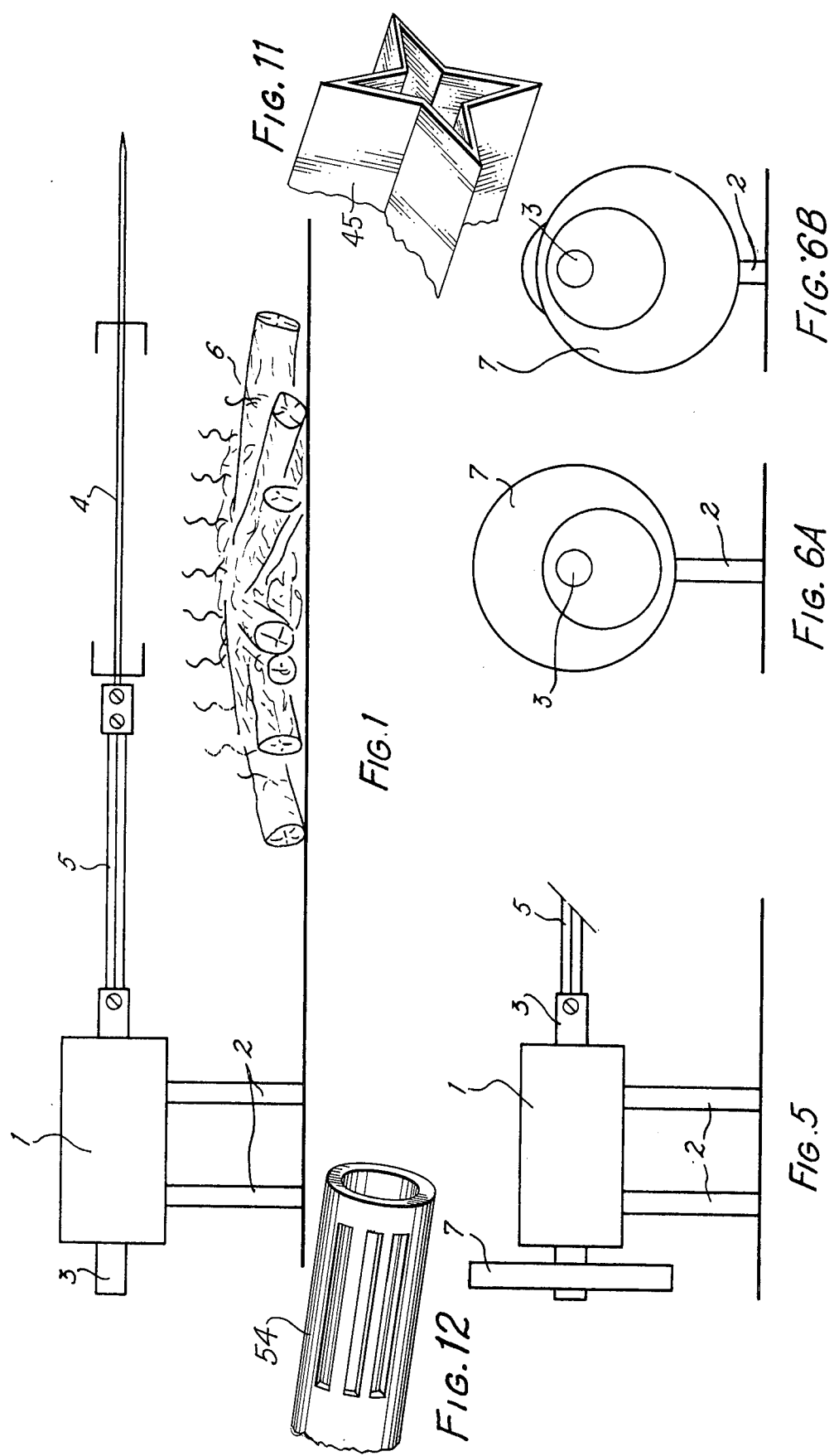
Figure 2:
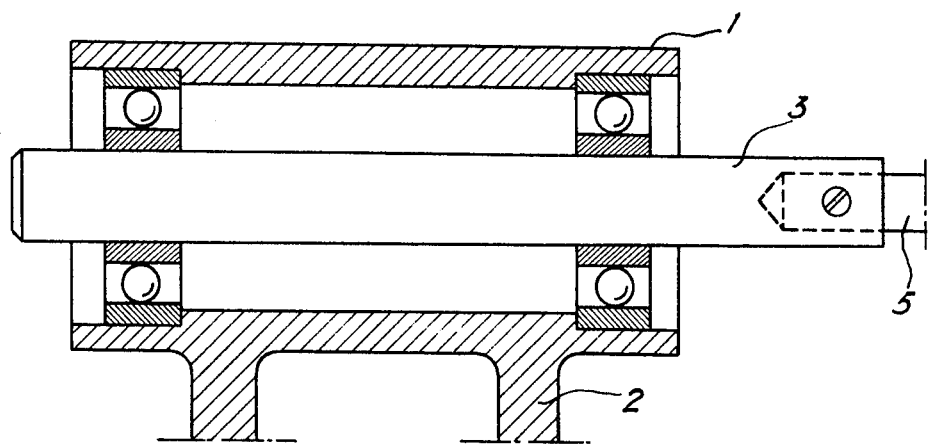
FIG. 2 is a longitudinal section of a detail of FIG. 1

In a first embodiment represented in FIGS. 1 and 2 the device is made up of a hollow cylinder 1 supported by two legs 2 that can be sunk into the ground or fastened to the frame of a grill or barbecue, a shaft 3, positioned coaxially in the cylinder by means of ball bearings and able to turn freely in the axis of the cylinder; shaft 3 is extended by a rotating unit, extended in relation to the shaft, and driven in rotation by shaft 3. This rotating unit is made up of a first part 4 which supports the roasting food piece. A second metal part 5 is located between shaft 3 and the first part 4, and is constantly subjected to the radiation of fire 6.

Figure 3A:
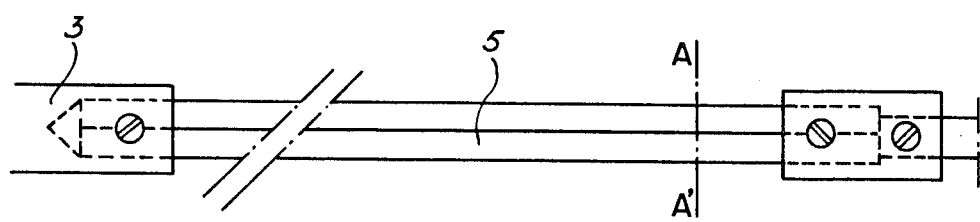
FIG. 3a is a longitudinal section of another detail of FIG. 1, with transverse section AA' as shown in FIG. 3b
Figure 3B:
Figure 4A:
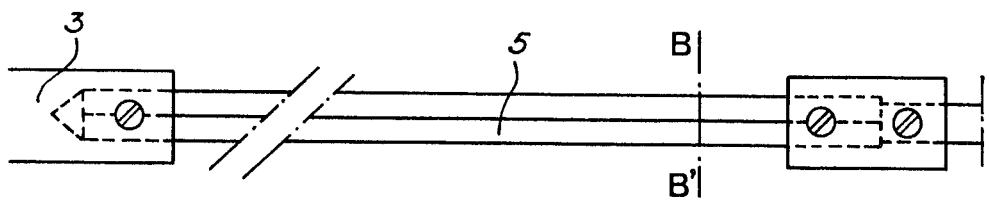
FIG. 4a is a view similar to FIG. 3, according to a variant embodiment, with transverse section BB' as shown in FIG. 4b
Figure 4B:

According to a first variant, the second part is made up of one or more rods, four in FIG. 3, and three in FIG. 4.

The rods 5 are made of metals having as great a heat expansion factor as possible, a radiated heat absorption factor as high as possible and a sufficient mechanical resistance to support, without permanent deformation, the weight of the food to be roasted.

Of the materials that are suitable, there can be cited all steels and stainless steels; light alloys currently used, despite their great heat expansion factor, are not suitable because beyond 300° they lose a great part of their mechanical resistance.

In a second variant, the rotating unit is a single hollow cylindrical tube whose part 4, opposite the bearing, has been deformed by crushing to present a star-shaped profile 45 as shown in FIG. 11 and thus assure the function of the spit; this star-shaped profile can also be that of the second part.

Preferably, the hollow tube, which is made of one of the materials mentioned above, is provided in part 5, with a plurality of longitudinal slots as shown in FIG. 12.

To remedy the difficulty of placing the roasting part on the shaft and to prevent the excess imbalance from opposing the rotation of the mobile unit, it is possible to mount on shaft 3 an imbalance corrector 7; FIGS. 5 and 6 represent such a system, previously known, and made up of two eccentric flywheels, that can turn in relation to one another and thus permit balancing of the unit in rotation. This corrector appears in FIGS. 6a and 6b in two different positions.

Since in practice it is not easy to pass the spit through the center of gravity of the piece to be roasted, chicken or the like, it is necessary to have a mobile unit in balance to compensate for the imbalance due to the food piece by a counterbalance of the same couple but in the opposite direction.

The eccentric flywheel device, proposed above, although theoretically valid has, in practice proven difficult to regulate because it is necessary to position the balancing masses both in direction and distance in relation to the axis.

Figure 7:
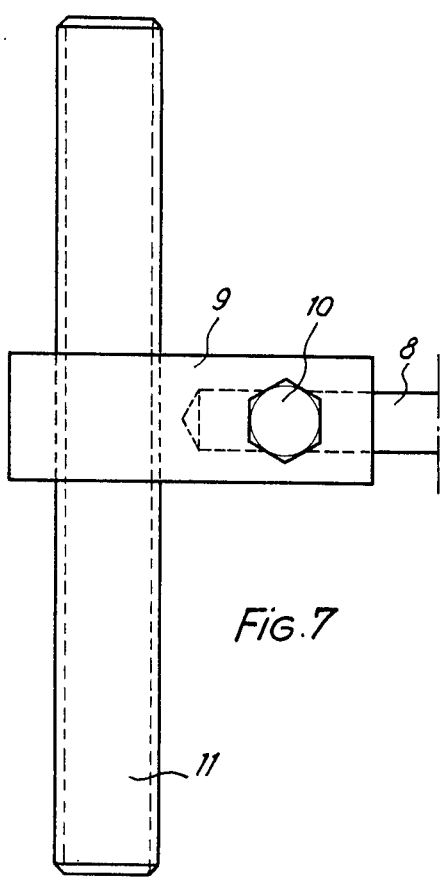
FIG. 7 is a profile view of the imbalance corrector according to a first preferred embodiment of the invention

According to FIG. 7, where the shaft of the turnspit is referenced as 8, it can be seen that the imbalance corrector according to a preferred embodiment of the invention is made up of a first element 9, here made up of a socket into which shaft 8 penetrates coaxially, locking screws 10 making it possible to make shaft 8 solid or not with element 9. A second element 11 such as a rack rod completes this corrector, element 11 which is a heavy piece, mobile in translation in relation to said first element in a direction approximately perpendicular to element 9, the correction of the imbalance being performed thanks to the movement of said element 11.

Figure 9:
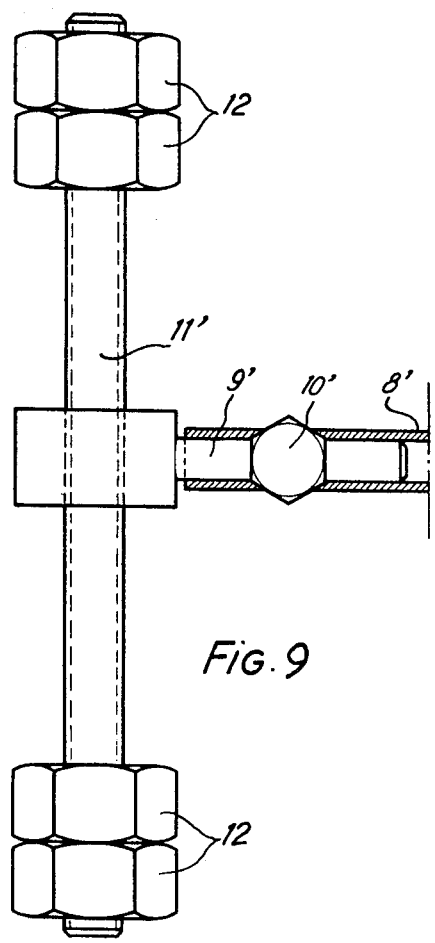
FIG. 9 is a profile view of the imbalance corrector according to a second preferred embodiment of the invention.

FIG. 9 illustrates another mode of embodiment of the corrector, where shaft 8' of the turnspit presents at its end a bore into which first element 9' penetrates, coaxially, screws 10' making it possible to make element 9' solid or not in relation to shaft 8'. In the present case, the second element 11' is a threaded rod, screwing into one of the ends of element 9'. Threaded flyweights 12 can be placed at the ends of rod 11' to correct excess imbalances.

Figure 8:
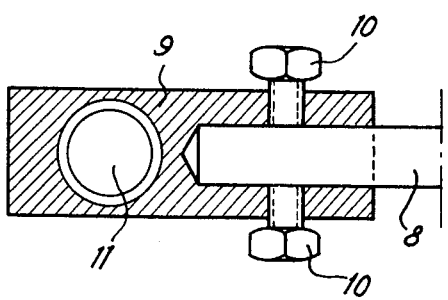
FIG. 8 is a top view, with partial section, of the corrector of FIG. 7
Figure 10:
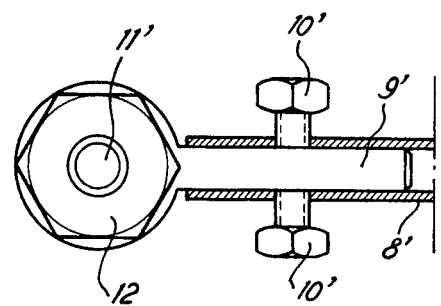
FIG. 10 is a top view, with partial section, of the corrector of FIG. 9.

FIGS. 8 and 10 represent top views, with partial sections, of the correctors illustrated respectively in FIGS. 7 and 9.

Going back to FIG. 7, adjustment of the imbalance corrector is done in four successive operations:

the first consists in moving threaded rod 11 so that it exhibits a great eccentricity the second consists in loosening the rotating unit (shaft 8 + roasting piece), by loosening screws 10, from its balancing device (imbalance corrector) so that both, under the influence of their respective imbalances, position themselves in the same vertical plane.

the third in making them solid with one another by action on set screw 10 fourth in raising the center of gravity of the balancing device to bring it above the axis in such a position that it exactly compensate for the imbalance of the piece to be roasted which is then obtained with great ease.

Thanks to this arrangement, it is also possible to correct the imbalance, during cooking operations.

I claim:

1. Turnspit moved by direct radiation from a fire, which comprises a shaft mounted in a system of bearings permitting its free rotation around its axis and, in the extension of said shaft and in an extended position in relation to said system of bearings a rotating unit, driven in rotation by said shaft, said rotating unit being made up of a first part supporting a roasting food piece, and a second metal part, located between said shaft and said first part, able to curve under the effect of the differential expansion resulting from the different temperature of the generatrix which receives the direct radiation of the fire and the generatrix opposite said fire.

2. Turnspit according to claim 1, wherein said second part is made up of one or more rods.

3. Turnspit according to claim 2, wherein said rods are at least three in number.

4. Turnspit according to claim 1, wherein said second part is a cylindrical tube.

5. Turnspit according to claim 1, wherein said first part and second second part are made of a cylindrical tube, said first part having a star-shaped section.

6. Turnspit according to claim 4 wherein said tube, at the level of said second part, exhibits a plurality of longitudinal slots.

7. Turnspit according to claim 1 wherein the metal constituting said second part is stainless steel.

8. Turnspit according to claim 1 which is provided with an imbalance corrector.

9. Turnspit according to claim 8, wherein the imbalance corrector is made up of two elements, namely, a first element placed coaxially to the turnspit shaft and provided with means making it possible to make said first element solid or not with said shaft, and a second element mobile in relation to the first element in a direction approximately perpendicular.

10. Turnspit according to claim 9, wherein said first element is a socket into which is introduced the shaft of the turnspit.

11. Turnspit according to claim 9, wherein said first element is a rod going into a bore made at the end of the shaft of the turnspit.

12. Turnspit according to claim 9 wherein the second element is a heavy piece able to translate in a perpendicular direction relative to said first element.

13. Turnspit according to claim 12, wherein said heavy piece is a rack rod.

14. Turnspit according to claim 12, wherein said heavy piece is a threaded rod screwing in one end of said first element, along an axis which is substantially perpendicular to that of said first element.

15. Turnspit according to claim 14, wherein the ends of the threaded rod are provided with additional threaded masses.

16. Turnspit according to claim 9, wherein said means consist of locking screws.

* * * * *

UNITED STATES PATENT AND TRADEMARK OFFICE
CERTIFICATE OF CORRECTION

PATENT NO. : 4,104,959
DATED : August 8, 1978
INVENTOR(S) : JEAN ROBERT DEMERSON It is certified that error appears in the above-identified patent and that said Letters Patent are hereby corrected as shown below:

Col. 2, line 1, "3a" should be --3A--;

Col. 2, line 3, "3b" should be --3B--;

Col. 2, line 4, "4a" should be --4A--;

Col. 2, line 6, "4b" should be --4B--;

Col. 2, line 9, "6a and 6b" should be --6A and 6B--;

Col. 2, line 67, "6a and 6b" should be --6A and 6B--;

Col. 3, line 49, "compensate" should be --compensates--;

Col. 4, line 18, "second" (first occurrence) should be --said--.

Signed and Sealed this

Third Day of April 1979

[SEAL]

Attest:

RUTH C. MASON
Attesting Officer

DONALD W. BANNER
Commissioner of Patents and Trademarks